United States Patent Office
3,479,305
Patented Nov. 18, 1969

3,479,305
PROCESS FOR PRODUCING FOAMS FROM CARBOXYLIC ACID DERIVATIVES AND ISOCYANATES BY WATER CATALYSIS
Stanley T. Kus, Griffith, and Fred W. Koenig, Highland, Ind., assignors to Standard Oil Company, Chicago, Ill., a corporation of Indiana
No Drawing. Continuation-in-part of application Ser. No. 448,254, Apr. 15, 1965. This application Jan. 17, 1968, Ser. No. 698,406
Int. Cl. C08g 20/20
U.S. Cl. 260—2.5
7 Claims

ABSTRACT OF THE DISCLOSURE

Novel thermally stable foams and prepolymers are prepared by reacting at temperatures in excess of 200° F. polyfunctional aromatic carboxylic acid derivatives comprising a benzene nucleus substituted by members selected from the group consisting of anhydride and carboxyl with a polyarylpolyisocyanate in the presence of a sufficient amount of water to catalyze the reaction. The foams are useful for insulation of walls, for fireproofing buildings and the like, and the prepolymers are useful to prepare molded products such as pipe molds.

---

This application is a continuation-in-part of Ser. No. 448,254, filed Apr. 15, 1965, by the same inventors, now abandoned.

This invention relates to the preparation of flame retardant foams and prepolymers from polyfunctional aromatic carboxylic acids and anhydrides and polyarylpolyisocyanate. In a particular aspect it relates to the preparation of flame retardant foams useful for insulation. In another aspect the invention relates to the preparation of prepolymers which are useful in the preparation of flame retardant molded and coated products such as pipe molds.

It has been discovered that flame resistant foams and prepolymers may be obtained when aromatic acids and anhydrides are reacted with polyarylpolyisocyanate in the presence of catalytic amounts of water sufficient to initiate the reaction. The reaction can be carried out at temperatures in excess of 200° F. Suitably the acid or anhydride and the polyarylpolyisocyanate mixture is heated to a temperature of above 200° F. before water is added. By the process of this invention foams are produced when aromatic acid or anhydrides are completely reacted with said polyarylpolyisocyanate. Prepolymers are formed by keeping the reaction from going to completion and provided that a sufficient amount of unreacted materials remain which upon heating will give a mold or foam depending on the use intended.

This invention is an improvement over the process disclosed in U.S. Patent No. 3,300,420 which discloses a process for preparing thermally stable inert resins capable of self-foaming wherein aromatic anhydrides and polyarylpolyisocyanates are reacted at elevated temperatures. It has been found that the addition of a sufficient amount of water, about 0.1 to 10 percent by weight of reactants, to catalyze the reaction greatly improves the process disclosed in the aforementioned patent. The addition of water permits the reaction to be run at lower temperatures and also allows much greater ease in processing. This unexpected activity of water in the polyarylpolyisocyanate aromatic acid or anhydride reaction is due to the fact that water accelerates and probably enters into the reaction.

Many aromatic acids and anhydrides give flame retardant foams when reacted with polyarylpolyisocyanates. The aromatic anhydrides or mixtures of these have a benzene, naphthalene, diphenyl, diphenyl ketone or diphenyl ether nucleus. The aromatic nucleus is at least disubstituted by carboxylic acid and anhydride groups. The aromatic nucleus can, of course, be substituted more than twice by the carboxylic acid or anhydride groups. Illustrative aromatic carboxylic acids and anhydrides useful in the preparation of foams and prepolymers are trimellitic anhydride, pyromellitic dianhydride, trimellitic acid, trimesic acid, hemimellitic anhydride, methyltrimellitic anhydride, 4'-carboxy diphenyl 3,4-dicarboxylic anhydride, di(phenyldicarboxylic anhydride) ketone, di(phenyldicarboxylic anhydride) ether, phthalic acid, 3,4,3',4'-tetracarboxybenzophenone, the dianhydride of 3,4,4',3'-tetracarboxybenzophenone, 3,4,3'-tricarboxybenzophenone, 4,4'-carboxybenzophenones, the monoanhydride of 3,4,3',4'-tetracarboxybenzophenone and mixtures thereof. The trimellitic anhydrides bis anhydride formed when trimellitic anhydride is reacted with a polyol as disclosed in U.S. Patent No. 3,183,248 is also useful. The trimellitic bis anhydrides have two trimellitic acid anhydride groups going through carboxylic acid position by ester linkage. This ester linkage can be joined by alkylene groups, for example, ethylene or propylene. In case ester linkages are joined by propylene the middle carbon can have an organic acid or ester attached to it without losing effectiveness in our process.

The polyarylpolyisocyanate useful in preparing the foams and prepolymers in the reaction with aromatic acids and anhydrides contained one or more aromatic nuclei and one or more isocyanato groups in each aromatic ring. Polyarylpolyisocyanates containing at least two aromatic rings with one isocyanato group on each aromatic ring can suitably be used in this process. These aromatic rings are conveniently interconnected by ether, sulfone, sulfoxide, methylene, propylene, or a carbonyl linkage or by two methylene groups connected by an isocyanato group. Polyarylpolyisocyanates which are isocyanate-substituted biphenyls are also useful in this process. In all of these cases the aromatic rings of the polyarylpolyisocyanates can be substituted by methyl, ethyl, propyl or ether groups. Specific examples of suitable polyarylpolyisocyanates useful in this process include polymethylene polyphenyl polyisocyanate having from 3 to 6 benzene rings; 4,4' - diphenylmethylene diisocyanate; diphenylmethylene 3,3'-diisocyanate; diphenyl diisocyanate; diphenylsulfone diisocyanate; diphenyl sulfoxide diisocyanate; and diphenyl propane diisocyanate. Polymethylene polyphenyl polyisocyanate and 4,4'-diphenylisocyanate and 4,4'-diphenylmethylene diisocyanate are particularly suitable polyarylpolyisocyanates. It must be understood that all of these isocyanates can tolerate substituents, such as chlorine, bromine and silicon. These substituents, inert under our reaction conditions, may be used in the conventional fashion to modify the properties of the foams and prepolymers of this invention.

Ratios of the polyarylpolyisocyanates to the aromatic acid derivatives are suitably adjusted so that there is not a large excess of either the aromatic acid derivative or the polyarylpolyisocyanates. In a suitable formulation the equivalent weight ratio of the liquid polyarylpolyisocyanate to the polyfunctional aromatic carboxylic acid derivative is 0.6 to 4.0. The same ratio is useful for the preparation of prepolymers.

It has been discovered that in addition to water small amounts of a polyol will also act as accelerators of the polyarylpolyisocyanate aromatic acid or anhydride reaction. The best results are obtained when water is used as initiator. Various other compounds act as modifiers or catalyst of the water initiated process of this invention. Tertiary amines, organo-tin compounds, organic salts of alkali and heavy metals are effective catalysts. Representative catalysts which can be used in the process of this invention to produce flame retardant foams include N-ethylmorpholene, N-cocoamorpholene, lithium ricinoleate, sodium oleate, cobalt acetate, cobalt naphthenate, trimethyl amine and dibutyl tin dilaurate.

The polymeric products of the water initiated process may be produced in foam form or as prepolymers which can be molded or later used as surface coatings or heated to produce a foam. The prepolymer is a product of the foaming process which is not carried to completion. This intermediate material is very versatile and has great practical utility. If the foaming reaction is carried to completion, a foam of uniform cell structure is obtained. In this process no blowing agent is necessary since the carbon dioxide evolved in the reaction of polyarylpolyisocyanate and aromatic acids or anhydrides acts as an internal blowing agent.

It has also been found that it is helpful to mix the polyarylpolyisocyanate and aromatic acid and anhydride and heat this mixture to a temperature above 200° F. and then add the water to initiate the reaction. The reactants are suitably agitated until a predetermined viscosity is reached. For each set of reactants there is a predeterminable viscosity at which agitation is to be terminated and the reactants are permitted to react and form the foam. The reaction will solidify upon cooling, producing a foam. The properties of said foam depend in general upon the degree of polymerization. At higher reaction or curing temperatures usually better foams are formed even when water is used to initiate the reaction.

The flame retardant properties of the foams are enhanced when the foaming reaction is carried out at high temperatures, or alternatively the reaction product is cured at a temperature upwards of 400° F. for a short period of time. A cure lasting from 1 to about 8 hours is sufficient. Products formed by the process where water is added at elevated temperatures need only be cured for a short period of time. The prepolymers are usually obtained by running the reaction at lower temperatures or alternatively stopping the reaction when it has reached a certain predetermined temperature, usually about 200 to 250° F. These prepolymers may be charged into molds and foamed in these molds by heating. The foams formed by heating the prepolymers have generally the same properties as those when the reaction is carried without interruption.

In the preferred process a foam is formed by heating a prepolymer at temperatures in excess of 200° F. wherein the prepolymer is prepared by reacting an organic polyarylpolyisocyanate which polyarylpolyisocyanate contains at least 2 interconnected aromatic rings having at least 1 isocyanato group per aromatic ring and an aromatic acid or anhydride in an amount of from about 0.5 to about 1.5 moles of the aromatic acid or anhydride per mole of the organic polyarylpolyisocyanate in the presence of a sufficient amount of water to initiate the reaction. Suitably, the amount of water added varies from 0.1 to 10 percent by weight of the reactants.

In general, the foams have a density of about 1 to 20 pounds per cubic foot. They are non-flammable and sustain a low weight loss when placed in a flame. This is considered remarkable when compared to many commercial foams which are labeled as fire-resistant foams. Those commercial foams have a burning weight loss in excess of 80 percent and many support a flame outright. Since polymeric products produced by the process of this invention are non-flammable, they are useful for heat insulation, such as pipe covering, insulation of ovens, insulation of walls or fireproofing buildings and the like.

All of these foams are tested in a standard flame test developed in our laboratory. In this flame test the temperature of the flame is 2400° F. The sample, cut in ¾ inch thickness having a 5 inch diameter, is placed in a flame 1¼ inches from the nozzle and is rotated during the flame test. The gas and oxygen flow is measured on a rotometer. The rate for the fuel gas stream is 0.8 s.c.f. per hour and the rate of oxygen is 1.1 s.c.f. per hour and the ratio is 0.8 volume of gas for each 1.1 volume of oxygen. It takes 48 seconds to complete each rotation and the sample makes a total of 4 revolutions. Thus, each sample has been in the flame for 192 seconds. The sample is then weighed. The weight is compared to the original weight and the loss in weight is calculated. From this we have obtained the percent of burning weight loss.

The cell structure of the foam is improved through certain additives; for example, a small amount of silicone. The silicone additives are employed in amounts of 2 percent or less. Amounts in the order of 0.2 percent are effective depending on the type of silicone used. A polymethyl siloxane and polymethylphenyl siloxanes are particularly useful cell structure stabilizers.

The following examples are included as illustrations of the process of this invention. They are not intended as limitations thereof.

EXAMPLE I

Two hundred grams of polymethylene polyphenyl isocyanate having an average of 3 benzene rings each substituted by an isocyanato group and having a molecular weight of 400, an equivalent weight of 134 and a functionality of 3, 120 grams of trimellitic anhydride were mixed and heated to 350° F. They were mixed and continuously kept under agitation. The mixture was heated to 350° F. and then water was added until a color change was observed. A total of 4 grams of water was added. The stirring was stopped at 390° F. A flame retardant foam was formed showing a weight loss of 15 percent.

EXAMPLE II

Ninety-six grams of trimellitic anhydride and 175 grams of polymethylene polyphenyl isocyanate having a molecular weight of 340, an equivalent weight of 132 and a functionality of 2.5 to 2.7 were heated to 260° F. The reactants were mixed and continuously kept under agitation. The mixture was heated to 350° F. and then water and epoxided soybean oil were added until a color change was observed. A total of 0.5 gram of water and 2.5 grams of epoxided soybean oil were added. A thickening of the reactants occurred and after 9 minutes a prepolymer was formed. This prepolymer was used to produce a flame retardant 4″ pipe mold of good quality.

EXAMPLE III

Twenty grams of polymethylene polyphenyl isocyanate having an average of 3 benzene rings each substituted by an isocyanato group and having a molecular weight of 400, an equivalent weight of 134 and a functionality of 3, 12 grams of trimellitic anhydride, and 0.5 gram of a silicon oil which is a polydimethyl/silicone having ether and/or hydroxyl groups were mixed until a uniform premix was obtained. To the premix 10 drops of water were added with vigorous stirring until the foaming mass was too thick to mix. To foaming mass was placed into an oven at 430° F. where the remainder of the foaming reaction was completed and the cure took place. After curing for 4 hours a strong foam was obtained which showed excellent flame retardance.

We claim:
1. An improved process for producing thermally stable foams by reacting at a temperature in excess of 200° F. (I) a polyfunctional aromatic carboxylic acid derivative comprising an aromatic nucleus substituted by members selected from the group consisting of anhydride and carboxyl; and (II) a liquid polyarylpolyisocyanate which liquid polyarylpolyisocyanate contains at least two interconnected aromatic rings having at least one isocyanato group per aromatic ring wherein the equivalent weight ratio of the liquid polyarylpolyisocyanate to the polyfunctional carboxylic acid derivative is 0.6 to 4.0, wherein said improvement comprises the addition of a sufficient amount of water, about 0.1 to 10 percent by weight of the reactants, to catalyze the reaction between the aromatic carboxylic acid derivative and the polyarylpolyisocyanate.

2. The process of claim 1 wherein the polyfunctional aromatic carboxylic acid derivatives and the polyarylpolyisocyanate mixture is heated to a temperature above 200° F. before a sufficient amount of water, about 0.1 to 10 percent by weight of the reactants, is added to catalyze the reaction between the aromatic carboxylic acid derivative and the polyarylpolyisocyanate.

3. The process of claim 1 wherein the polyfunctional aromatic carboxylic acid derivative is trimellitic anhydride.

4. An improved process for producing a thermally stable prepolymer by reacting at a temperature in excess of 200° F. (I) a polyfunctional aromatic carboxylic acid derivative comprising an aromatic nucleus substituted by members selected from the group consisting of anhydride and carboxyl; and (II) a liquid polyarylpolyisocyanate which liquid polyarylpolyisocyanate contains at least two interconnected aromatic rings having at least one isocyanato group per aromatic ring wherein the equivalent weight ratio of the liquid polyarylpolyisocyanate to the polyfunctional carboxylic acid derivative is 0.6 to 4.0, said improvement comprising the addition of a sufficient amount of water, about 0.1 to 10 percent by weight of the reactants, to catalyze the reaction between the aromatic carboxylic acid derivative and the polyarylpolyisocyanate.

5. The process of claim 4 wherein the polyfunctional aromatic carboxylic acid derivative and the polyarylpolyisocyanate mixture is heated to a temperature above 200° F. before a sufficient amount of water, about 0.1 to 10 percent by weight of the reactants, is added to catalyze the reaction between the aromatic carboxylic acid derivative and the polyarylpolyisocyanate.

6. The process of claim 4 wherein the polyfunctional aromatic carboxylic acid derivative is polymethylene polymethylene polyphenyl polyisocyanate.

7. The process of claim 4 wherein the polyfunctional aromatic carboxylic acid derivative is trimellitic anhydride.

References Cited

UNITED STATES PATENTS

| | | | |
|---|---|---|---|
| 3,072,582 | 1/1963 | Frost | 260—2.5 |
| 3,300,420 | 1/1967 | Frey | 260—2.5 |
| 3,314,923 | 4/1967 | Muller et al. | 260—78 |
| 3,317,480 | 5/1967 | Fetscher et al. | 260—77.5 |

FOREIGN PATENTS 861,858　3/1961　Great Britain.

OTHER REFERENCES

Saunders et al.: Polyurethanes, Interscience, New York, 1962, pp. 314–315.

DONALD E. CZAJA, Primary Examiner

M. J. WELSH, Assistant Examiner